United States Patent
Pentkovski et al.

(10) Patent No.: US 6,369,813 B2
(45) Date of Patent: *Apr. 9, 2002

(54) PROCESSING POLYGON MESHES USING MESH POOL WINDOW

(75) Inventors: Vladimir Pentkovski; Deep Buch, both of Folsom; Michael K. Dwyer; Hsien-Hsin Lee, both of El Dorado Hills; Hsien-Cheng E. Hsieh, Gold River, all of CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/109,257

(22) Filed: Jun. 30, 1998

(51) Int. Cl.$^7$ .................................. G06T 15/00
(52) U.S. Cl. ............................ 345/419; 345/537
(58) Field of Search ................. 345/433, 526, 345/419, 502, 503, 537, 538, 543

(56) References Cited

U.S. PATENT DOCUMENTS

| | | | | |
|---|---|---|---|---|
| 5,689,577 A | * | 11/1997 | Arata | 382/128 |
| 5,706,481 A | * | 1/1998 | Hannah et al. | 345/519 |
| 5,812,136 A | * | 9/1998 | Keondjian | 345/419 |
| 5,995,107 A | * | 11/1999 | Berteig et al. | 345/320 |
| 6,008,820 A | * | 12/1999 | Chauvin et al. | 345/502 |
| 6,078,331 A | * | 6/2000 | Pulli et al. | 345/423 |
| 6,137,492 A | * | 10/2000 | Hoppe | 345/420 |

* cited by examiner

Primary Examiner—Jeffery Brier
Assistant Examiner—Ryan Yang
(74) Attorney, Agent, or Firm—Blakely, Sokoloff, Taylor & Zafman LLP

(57) ABSTRACT

The present invention is directed to a method and apparatus for processing normalized meshes. The normalized meshes are formed by N polygons which have M vertices. M vertex coordinates are stored in a vertex array corresponding to the M vertices of the N polygons. N polygon indices are stored in an index array. Each of the N polygon indices references a predetermined number of the M vertex coordinates. A first subset of the index array having N1 polygon indices is determined. A second subset of the vertex array is selected such that the second subset contains M1 vertex coordinates corresponding entirely to the N1 polygon indices in the first subset. The second subset defines a window having a small size relative to the vertex array. The M1 vertex coordinates in the second subset are processed to generate processed data. The processed data are then concurrently sent to a graphics processor in an on-line manner.

20 Claims, 14 Drawing Sheets

PROCESSING POLYGON MESHES USING MESH POOL WINDOW

BACKGROUND OF THE INVENTION

1. Field of the Invention

This invention relates to graphic processing. In particular, the invention relates to graphic processing using polygon meshes.

2. Description of Related Art

In three-dimensional (3-D) graphics, objects are represented using a number of techniques such as polygon mesh, modeling, etc. Among these techniques, polygon mesh representation is popular.

In polygon mesh representation, an object is represented by a mesh of polygonal facets. In the general case, an object has curved surfaces and the facets are an approximation to such a surface. A polygon mesh representation is a geometric and topological description of the boundary or surface of the object. A polygon mesh is a structure that consists of polygons represented by a list of (x, y, z) coordinates that are the polygon vertices. Thus the information stored to describe the object is a list of coordinates of points or vertices.

When a 3-D object is processed by a processor in a computer system, the processing time depends on a number of factors. One of the important factors is the memory referencing time to retrieve the information describing the objects such as the list of vertex coordinates. In 3-D graphics processing, the list of vertex coordinates are usually indexed or referenced by the corresponding polygon indices. The processing of the polygons involving the indexing of the vertex coordinates and transformation calculations is referred to as the geometry computations.

On-line driver is a method that allows the commands to a graphics controller (GC) to be sent to the GC concurrently with the geometry computations to speed up the overall processing time. However, when the size of the indexed primitives is large, such as in complex 3-D scenes, the on-line driver becomes inefficient. The reason for this inefficiency is that if the GC does not support indexed primitives, as is often the case, the entire pool of indexed primitives has to be stored in an intermediate buffer and the vertex information is sent to the GC on a polygon-by-polygon basis. This will eliminate the gain of concurrent processing and cause dirty writebacks from the intermediate buffer which incurs additional overhead.

Therefore there is a need in the technology to provide an efficient method and apparatus to process the polygon meshes for 3-D graphics.

SUMMARY OF THE INVENTION

The present invention is directed to a method and apparatus for processing normalized meshes. The normalized meshes are formed by N polygons which have M vertices. The M vertex coordinates are stored in a vertex array corresponding to the M vertices of the N polygons. N polygon indices are stored in an index array. Each of the N polygon indices references a predetermined number of the M vertex coordinates. A first subset of the index array having N1 polygon indices is determined. A second subset of the vertex array is selected such that the second subset contains M1 vertex coordinates corresponding entirely to the N1 polygon indices in the first subset. The second subset defines a window having a small size relative to the vertex array. The M1 vertex coordinates in the second subset are processed to generate processed data. The processed data are then concurrently sent to a graphics processor in an on-line manner.

BRIEF DESCRIPTION OF THE DRAWINGS

The features and advantages of the present invention will become apparent from the following detailed description of the present invention in which.

DESCRIPTION OF THE PRESENT INVENTION

The present invention is directed to a method and apparatus for processing normalized meshes in three-dimensional (3-D) graphics. Normalized meshes allow efficient use of cache memory by confining references to within windows of memory. Mesh normalization is performed by iteratively searching for an optimal window size for the vertex array while copying referenced vertex information to the local window. During real-time processing of the 3-D objects represented by normalized meshes, the geometry engine uses the predetermined window to reference the vertices. After processing, the geometry engine writes the transformed vertices to the graphics controller in an on-line fashion. This method of processing eliminates dirty writebacks by keeping the window small, and the on-line driver allows concurrency of processing and writing, thereby improving the overall graphic processing throughput.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
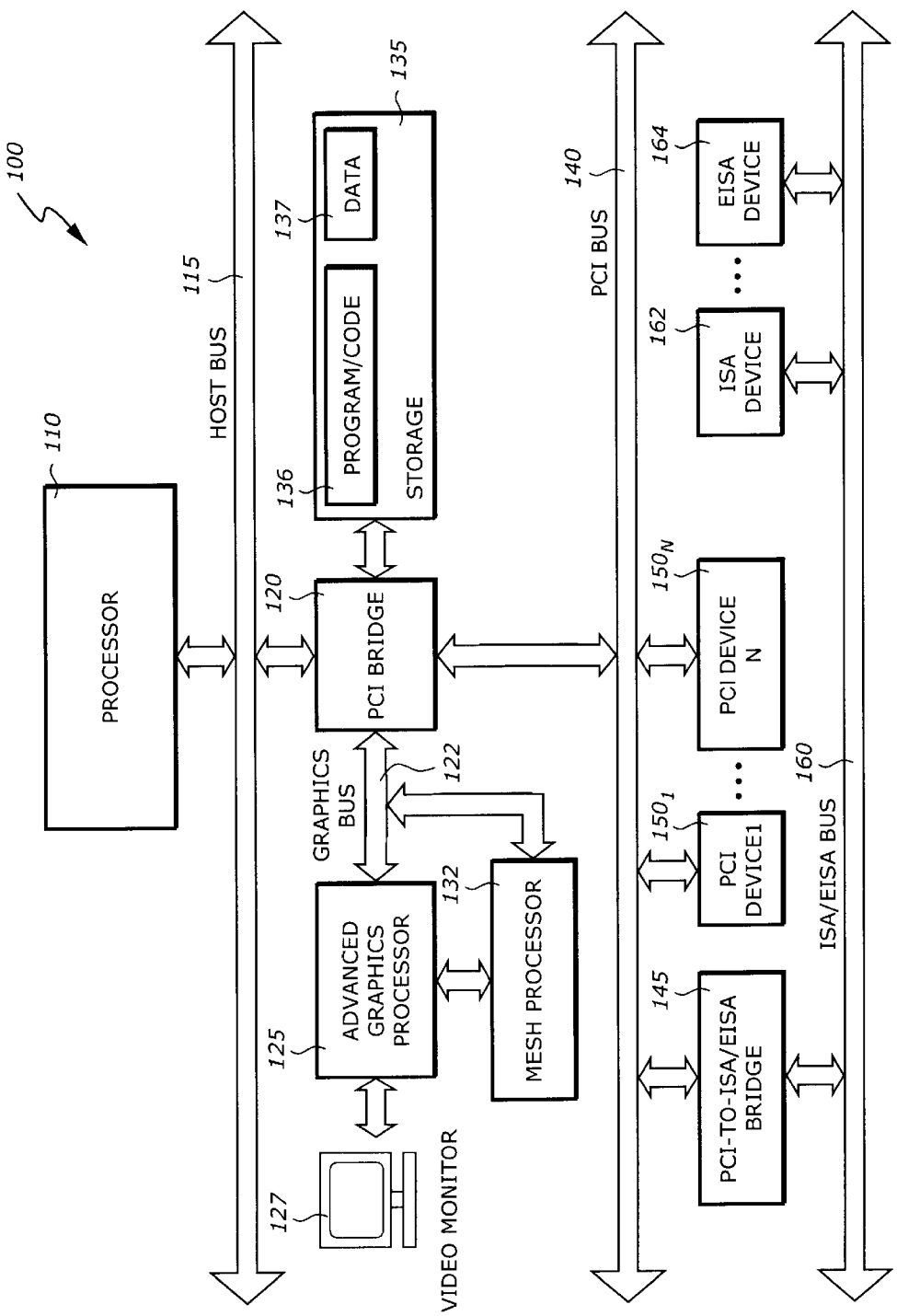
FIG. 1 is a diagram illustrating one embodiment of a computer system 100 in which one embodiment of the present invention may be utilized.

FIG. 1 is a diagram illustrating one embodiment of a computer system 100 in which one embodiment of the present invention may be utilized. Computer system 100 comprises a processor 110, a host bus 115, a PCI bridge 120, a storage device 135, an advanced graphics processor 125, a mesh processor 132, a video monitor 127, a PCI bus 140, The host processor 110 represents a central processing unit of any type of architecture, such as complex instruction set computers (CISC), reduced instruction set computers (RISC), very long instruction word (VLIW), or hybrid architecture. The processor 110 is coupled to the PCI bridge 120 via a host bus 115. While this embodiment is described in relation to a single processor computer system, the invention could be implemented in a multi-processor computer system.

The PCI bridge 120 provides an interface between the host bus 115 and a PCI bus 140. The PCI bridge 120 also provides the graphic port, e.g., Accelerated Graphics Port (AGP), or the graphics bus 122 for connecting to a graphics controller or advanced graphics processor 125. The graphics controller 125 is interfaced to a video monitor 127. The video monitor 127 displays graphics and images rendered or processed by the graphics controller 125. The PCI bridge 120 also provides an interface to the storage device 135.

The storage device 135 represents one or more mechanisms for storing data. For example, the storage device 135 may include read only memory (ROM), random access memory (RAM), magnetic disk storage mediums, optical storage mediums, flash memory devices, and/or other machine-readable mediums. FIG. 1 also illustrates that the storage device 135 has stored therein data 137 and program code 136. The data 137 stores graphics data and temporary data. Program code 136 represents the necessary code for performing any and/or all of the techniques in the present invention. Of course, the storage device 135 preferably contains additional software (not shown), which is not necessary to understanding the invention.

The PCI bus 140 represents an expansion bus that allows the processor 110 to communicate with a number of peripheral devices. The PCI bus 140 provides an interface to a PCI-to-ISA/EISA bridge 145, PCI devices $150_1$ to PCI device $150_N$. The PCI devices $150_1$ to $150_N$ represent any device that is interfaced to the PCI bus 140. Examples of PCI devices are fax/modem controller, audio card, network controller, etc.

The PCI-to-ISA/EISA bridge 145 represents an interface device between the PCI bus 140 and an ISA/EISA bus 160.

The ISA/EISA bus 160 represents a peripheral bus that interfaces to a number of peripheral devices, including an ISA device 162, an EISA device 164. Example of an ISA/EISA device includes a parallel input/output (I/O) device, a serial communication interface device.

Figure 2:
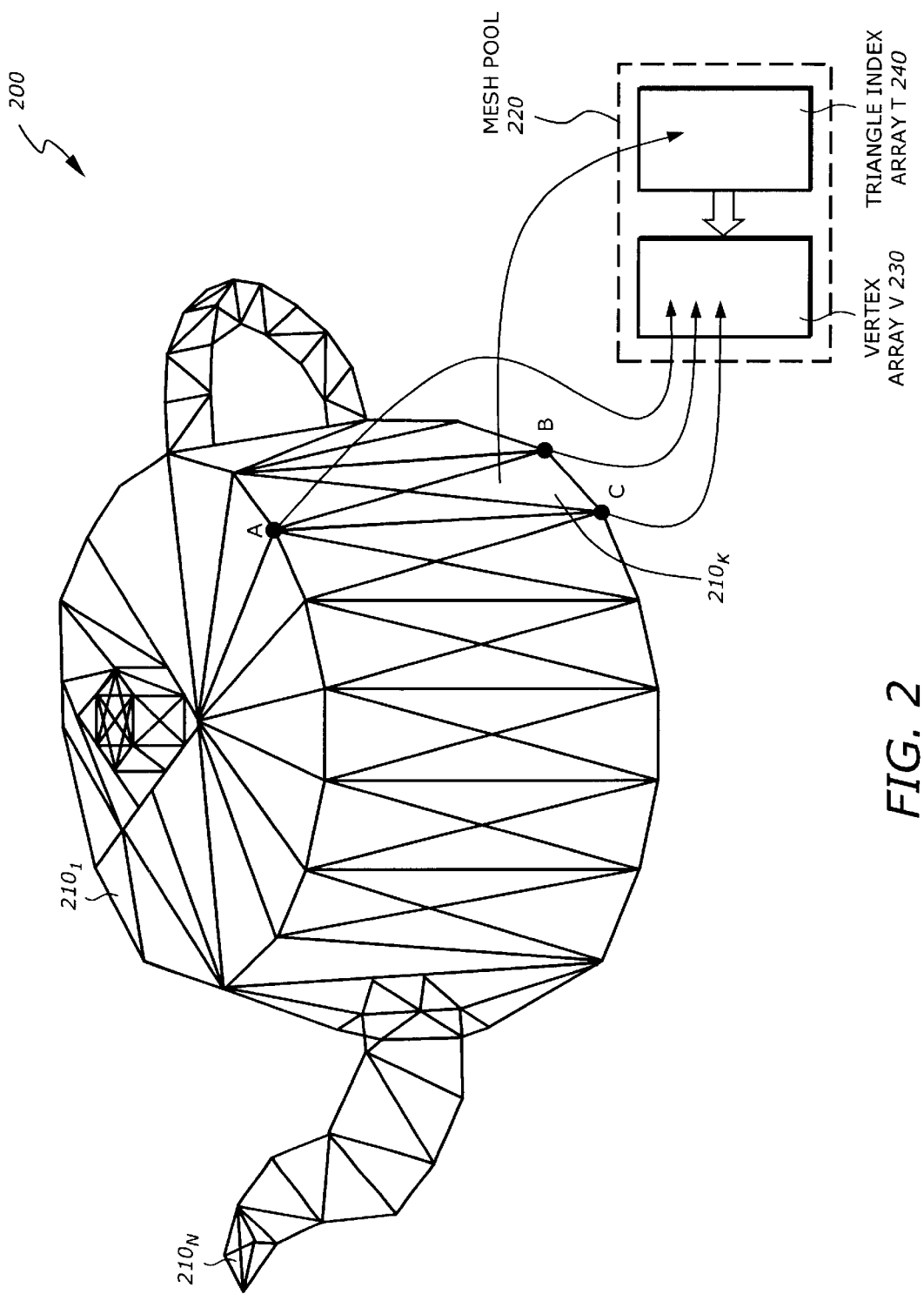
FIG. 2 is a diagram illustrating a three-dimensional (3-D) object represented by polygons according to one embodiment of the invention.

FIG. 2 is a diagram illustrating a three-dimensional (3-D) object 200 represented by polygons according to one embodiment of the invention. The object 200 is represented by a number of triangles $210_i$ where i=1, . . . , N (N is a positive whole number) and the representation information is stored in a mesh pool 220. As is known by one skilled in the art, other types of polygon other than the triangle can be employed.

Each of the triangles $210_i$ is represented by three vertices. For example, triangle $210_k$ is represented by three vertices A, B, and C. The three vertices A, B, and C form a surface which will be rendered by the processor or graphics controller. The surface formed by the three vertices A, B, and C are determined by the coordinates of the vertices A, B, and C. The complete object 200 is described by the list of the triangles $210_i$ (i=1, . . . , N) and the list of the corresponding vertex coordinates which are stored in the mesh pool 220.

The mesh pool 220 stores the representation information of the object 200. The mesh pool includes a vertex array V 230 and a triangle index array T 240. In one embodiment, a portion of the vertex array V 230 and the triangle index array T 240 is located in a cache memory which can be referenced locally by a processor.

The vertex array V 230 stores the coordinates of the vertices of the triangles $210_i$ (i=1, . . . , N). For 3-D objects, these coordinates are the (x, y, z) components in a 3-D coordinate system. The number of entries in the vertex array V 230 depends on the number of triangles $210_i$ (i=1, . . . , N), or the number N, and the manner these triangles are interconnected in the meshes. A vertex in one triangle may be also be a vertex of one or more triangles in the meshes. Because of this redundancy, the number of entries in the vertex array V 230 usually exceeds N. For a complex 3-D object which has a large number of triangles, the number of entries in the vertex array V 230 may be quite large. For example, assuming the number of triangles for a 3-D object is 100,000 and the redundancy is 3 (i.e., each vertex belongs to three triangles on the average), then the total number of entries is 300,000. Each entry has 3 coordinate values. Assume further that each coordinate value is represented by a 32-bit floating point number, then each entry requires 12 bytes. The vertex array V 230 therefore would need a storage amount of approximately 3.6 MB. This amount of storage exceeds the normal size of typical cache memory. The vertex array V 230 is therefore usually stored in main memory and blocks of data are transferred to the cache memory when needed. If the references of these vertices by the triangle index array T 240 are not within the cache locality, dirty writebacks are needed. These writebacks will incur additional processing time.

The triangle index array T 240 stores the triangle indices and the corresponding vertex references. For example, the triangle index k for the triangle $210_k$ has three references to the vertices A, B, and C. The references or the pointers, or the addresses of the coordinate data are stored in the triangle index array T 240 along with the corresponding triangle index. If this triangle index array T 240 is stored in the cache memory, additional cache storage has to be allocated for the triangle index array which further limits the cache allocation for the vertex array V 230.

The vertex array V 230 may store the vertex information in a unnormalized or a normalized manner. A unnormalized vertex array results in extensive dirty writebacks and increases the processing time while a normalized vertex array reduces or even eliminates dirty writebacks and reduces the processing time.

Figure 3:
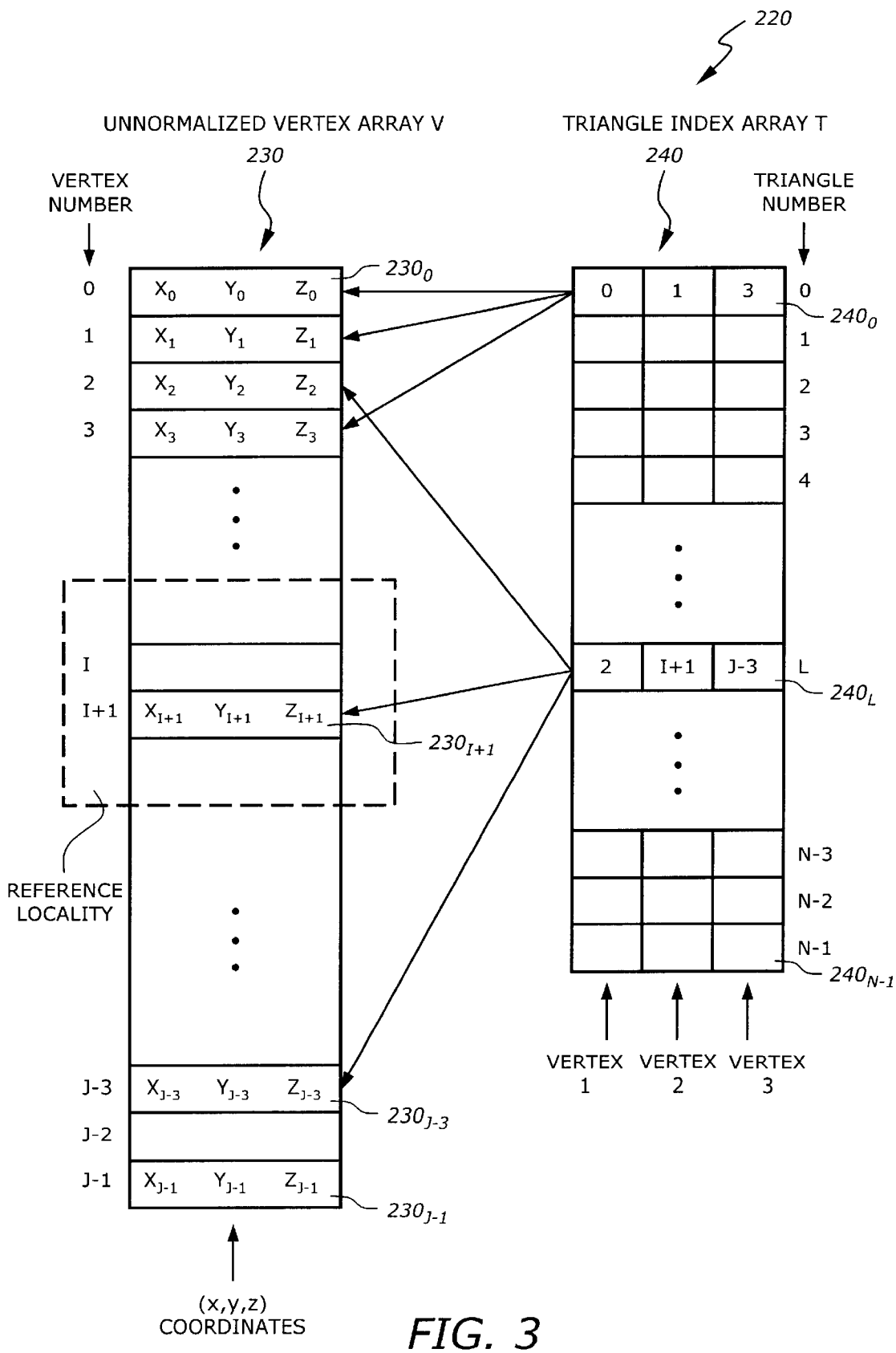
FIG. 3 is a diagram illustrating arrays for processing unnormalized meshes according to one embodiment of the invention.

FIG. 3 is a diagram illustrating arrays for processing unnormalized meshes according to one embodiment of the invention. The mesh pool 220 includes an unnormalized vertex array V 230 and a triangle index array T 240. For clarity, the arrays are shown storing entries rather than actual memory byte locations.

The unnormalized vertex array 230 contains J entries for J vertices numbered from 0 through J−1. Each vertex entry includes three (x, y, z) coordinate values. As shown in FIG. 3, entry 230$_0$ stores the (X$_0$, Y$_0$, Z$_0$) coordinates of the vertex 0, entry 230$_{I+1}$ stores the (X$_{I+1}$, Y$_{I+1}$, Z$_{I+1}$) coordinates of the vertex I+1, etc.

The triangle index array 240 contains N entries for N triangles numbered from 0 through N−1. Each index entry includes three vertex references, vertex 1, vertex 2, and vertex 3. For example, entry 240$_0$ stores the references 0, 1 and 3 (i.e., the triangle 0 is formed by three vertices 0, 1, and 3), entry 240$_L$ stores the references 2, I+1, and J−3 (i.e., the triangle L is formed by three vertices 2, I+1, and J−3), etc.

As illustrated in FIG. 3, a triangle index further down the index array T 240 (e.g., index L) may reference a vertex back at the beginning of the vertex array V 230 (e.g., vertex 2). As the triangle index array T 240 is processed sequentially from entry 0 to entry N−1, the vertex array V 230 is referenced in a random manner where an index may reference to a vertex that is located outside the cache locality. For this reason, processing unnormalized meshes results in many dirty writebacks which increases processing time.

Figure 4:
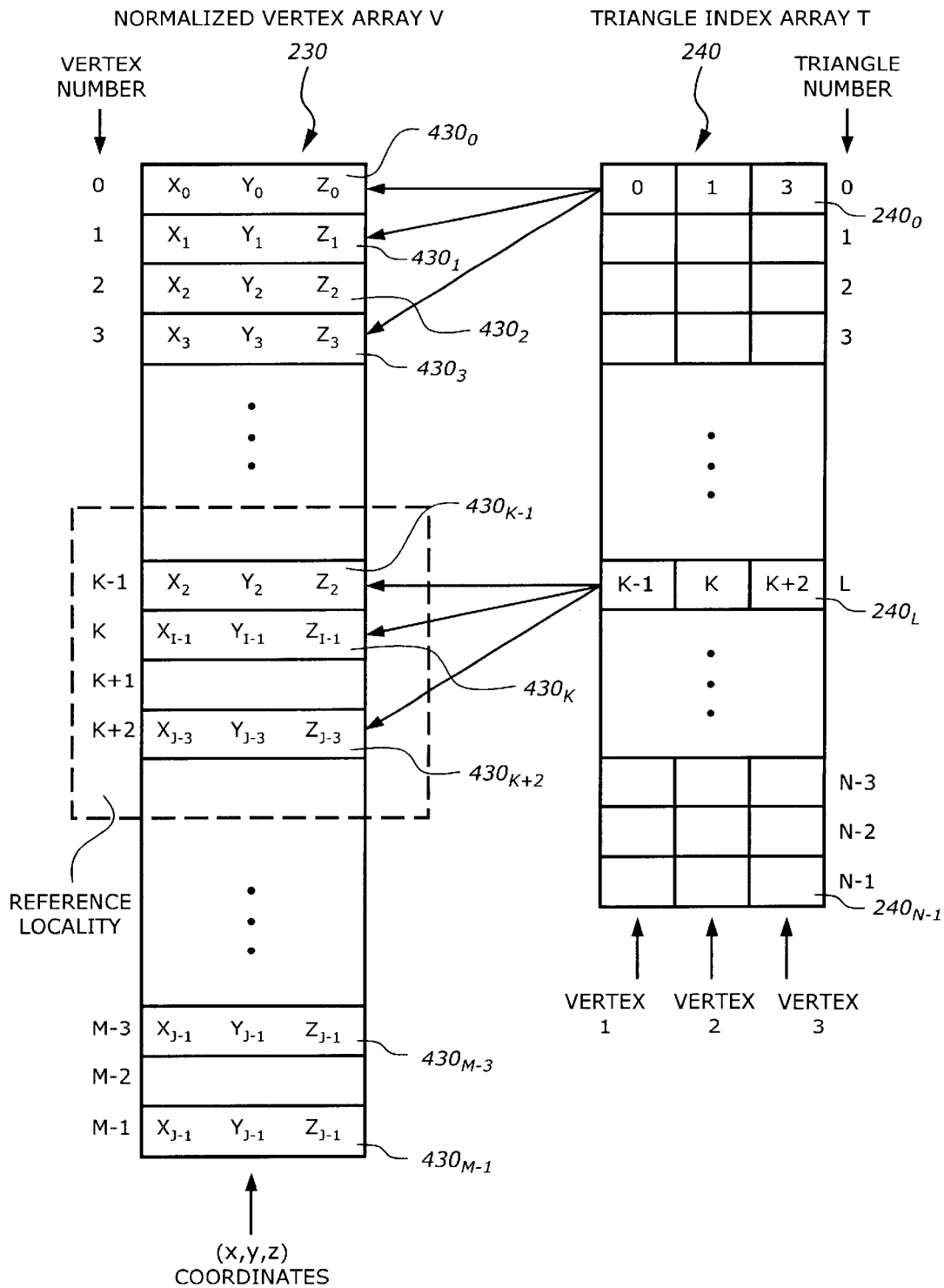
FIG. 4 is a diagram illustrating arrays for processing normalized meshes according to one embodiment of the invention.

FIG. 4 is a diagram illustrating arrays for processing normalized meshes according to one embodiment of the invention. The mesh pool includes a normalized vertex array V 230 and a triangle index array 240.

The vertex array V 230 is normalized to localize the vertex data in small regions which can be referenced locally by the triangle indices, preserving cache locality and reducing or even eliminating dirty writebacks. To localize the references, redundant vertex data are replicated and stored in the neighborhood of the corresponding vertex locations. For example, the triangle index L references the vertices 2, I+1, and J−3 (FIG. 3). As shown in FIG. 3, the references 2 and J−3 are located outside the cache locality surrounding the vertex I+1. The normalized vertex array V 230 duplicates the entries 2 and J−3 to bring them to the neighborhood of the entry K. Entry 430$_2$ containing the (X$_2$, Y$_2$, Z$_2$) coordinates is duplicated to occupy entry location K−1, entry 430$_{M-3}$ containing the (X$_{J-3}$, Y$_{J-3}$, Z$_{J-3}$) coordinates is duplicated to occupy entry location K+2. Both the entry locations K−1 and K+2 are now in the neighborhood of the entry K which contains the vertex data for the vertex 3 of the triangle index L. Note that the triangle index entry L is now updated to contain the new references K−1, K, and K+2 which correspond to the same vertices 2, I+1, and J−3 in FIG. 3.

By bringing the vertex data corresponding to a triangle index into a region that can be referenced locally, the number of cache replacements and dirty writebacks is reduced. Normalized meshes are, therefore, preferred to unnormalized meshes for speeding up the processing time. To further improve the processing time, the normalized meshes are organized according to a window structure.

Figure 5:
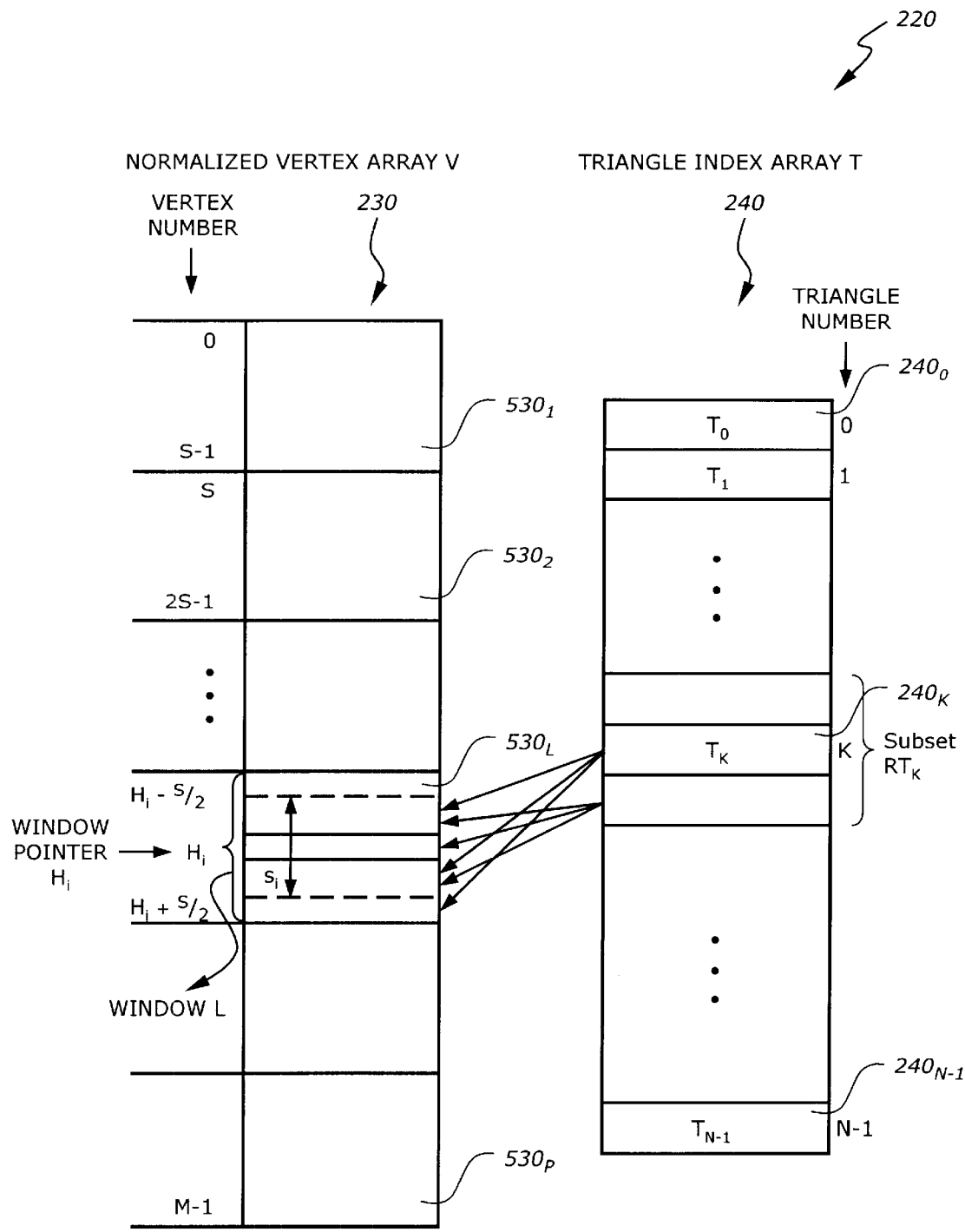
FIG. 5 is a diagram illustrating arrays for processing normalized meshes using windows according to one embodiment of the invention.

FIG. 5 is a diagram illustrating arrays for processing normalized meshes using windows according to one embodiment of the invention. The mesh pool 220 includes a normalized vertex array V 230 with windows and a triangle index array T 240.

The normalized vertex array V 230 is divided into P windows having the same size S. The P windows may be overlapped or distinct. Each of the P windows stores vertex entries that can be referenced entirely by a subset of triangle indices. A window is characterized by its center reference pointer H$_i$ and its size S.

Any triangle index T$_i$ in a subset RT$_k$ of the triangle index array can reference a window L having a center reference H$_i$ and a size S$_i$. The window is typically of small size. In other words, there exists a small positive constant S such that S$_i$ is less than and equal to S and for all T$_i$ within the subset RT:

$$H_i - S/2 \leq R(T_i) \leq H_i + S/2$$

Where R(T$_i$) is the reference made by the triangle index T$_i$.

As illustrated in FIG. 5, the triangle index T$_k$ 240$_k$ references to the window 530$_L$ having a window center at H$_i$ with a size S.

As the processor or graphic controller (GC) progresses through the triangle index array T 240, the normalized vertex array V 230 is referenced on a window-by-window basis. The window essentially "slides" over the entire normalized vertex array 230 as the vertex references are being made. The consequences of this processing method includes the following advantages:

1) An on-line driver can be implemented even for a GC which does not support indexed primitives in hardware. The locality of reference and the sequential nature of the processing enable the writing of triangles or commands to the GC in the background of the geometry or transformation computations. Therefore, the performance advantages of concurrent or parallel processing can be realized.

2) Dirty writebacks from the cache memory can be reduced or eliminated because the window size is typically small, allowing several windows to be located entirely in the cache.

Figure 6:
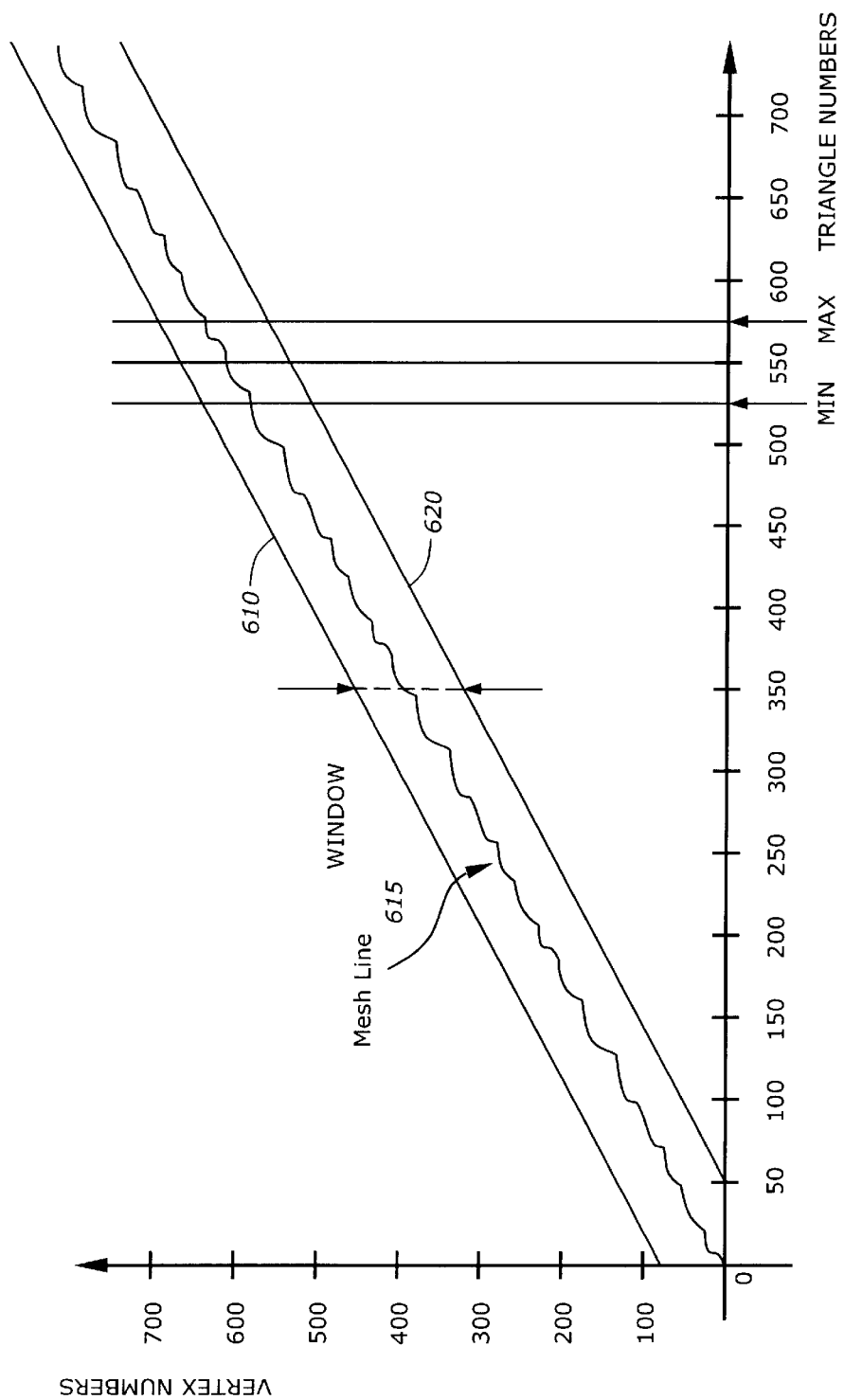
FIG. 6 is a diagram illustrating a performance curve according to one embodiment of the invention.

FIG. 6 is a diagram illustrating a performance curve according to one embodiment of the invention. The performance curve includes a horizontal axis corresponding to the triangle number and the vertical axis corresponding to the vertex number. The numbers shown on the axes are merely for illustrative purposes and do not carry any significance. The performance curve shows the processing of the vertices as the triangle number increases. The performance curves includes an upper line 610, a mesh line 615, and a lower line 620.

The upper and lower lines 610 and 620 define the limits of the window. As illustrated in FIG. 6, the window size S is constant throughout the processing of the triangle. The mesh line 615 shows the vertex numbers processed as the number of triangles processed increases. The mesh line 615 fluctuates indicating that the order of vertex references is not in the same sequential order as the triangle indices. However, for any particular triangle index, the vertex references are within the window as defined by the upper and lower lines 610 and 620.

The performance curve also shows the MIN and MAX values which refer to the pointer of triangle Ti={P$_{i1}$, P$_{i2}$, P$_{i3}$}

Figure 7:
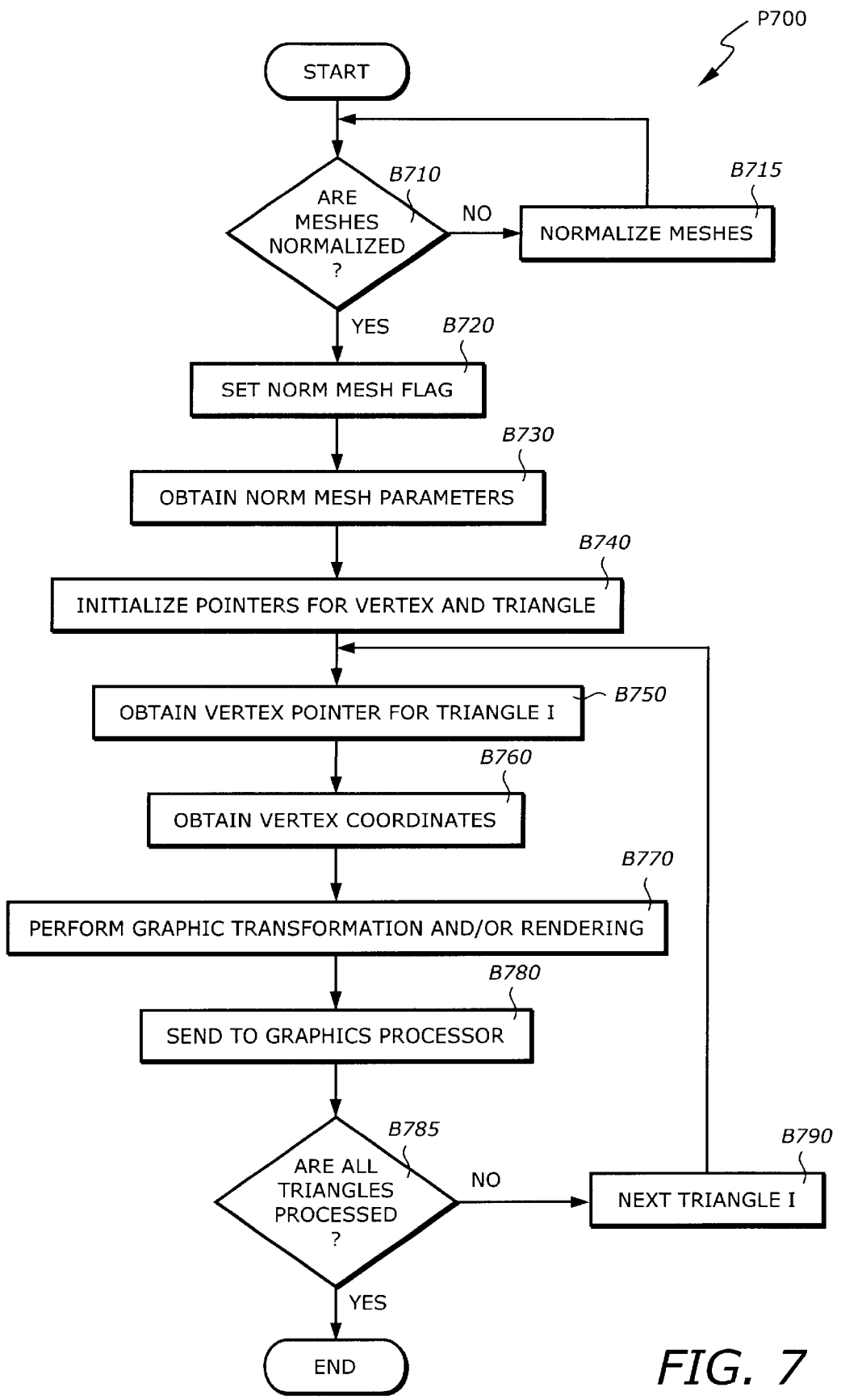
FIG. 7 is a flow diagram illustrating a process to process normalized meshes according to one embodiment of the invention.

FIG. 7 is a flow diagram illustrating a process P700 to process normalized meshes according to one embodiment of the invention.

Upon START, the process P700 determines if the meshes have been normalized, i.e., if the vertex array has been normalized (Block B710). If not, the process P700 performs mesh normalization (Block B715) and then returns back to block B710. If the meshes have been normalized, the process P700 proceeds to set a normalized mesh flag to inform the GC that the vertex array is normalized (Block B720). The process P700 next obtains the normalized mesh parameters (B730). These normalized mesh parameters include the window size S and the mesh ratio R. The mesh ratio R is defined as the ratio of two integers m and n that approximates M and N where M is the number of vertices and N is the number of triangles. The window pointer is a linear growing function of the index i: Hi=R*i where R is a mesh ratio m/n. The mesh ratio m/n provides the closest approximation of M/N.

Next, the process P700 initializes the pointers for the vertex and triangle index arrays (Block B740) and begins mesh processing. The process B700 slides the window by updating the window pointer Hi=Hi+m (Block B750). Then the process B700 obtains the vertex pointer and vertex coordinates (Block B760). Since the vertex array is normalized, the retrieval of the vertex coordinates takes place in the memory locality. The process P700 then performs graphic transformation and/or rendering on the vertex information and concurrently send the transformed data to the graphics processor on an on-line basis (Block B770). The process P700 next updates the triangle index I=I+n (Block B780).

The process P700 then determines if all the triangles have been processed (Block B785). If not, the process P700 updates the triangle index I (Block B790) and returns to obtain the next vertex pointer for the updated triangle index I (Block B750). If all the triangles have been processed, the process P700 terminates.

Although the process P700 is shown in sequential manner, many of the operations can be performed in parallel. For example, the graphic transformation/rendering in Block B770 and/or the transfer of graphic data to the graphic processor in Block B780 can be performed concurrently with the retrieval of vertex coordinates in Block B760.

The processing of unnormalized or normalized meshes can also be realized by hardware using a mesh processor to achieve even faster processing time.

Figure 8:
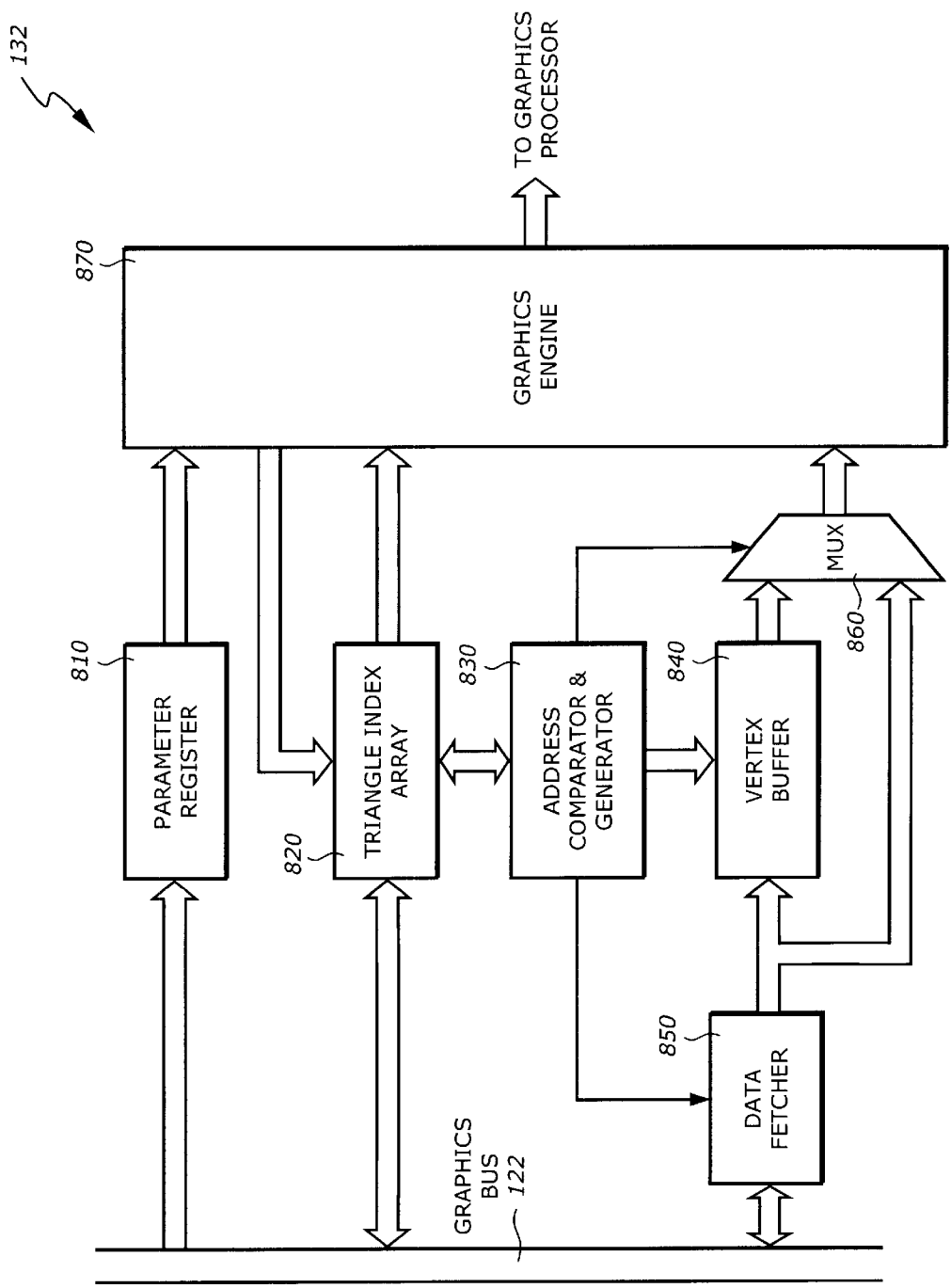
FIG. 8 is a diagram illustrating a mesh processor according to one embodiment of the invention.

FIG. 8 is a diagram illustrating a mesh processor 132 according to one embodiment of the invention. The mesh processor 132 includes a parameter register 810, a triangle index array 820, an address comparator and generator 830, a vertex buffer 840, a data fetcher 850, a multiplexer 860, and a graphics engine 870. The mesh processor 132 is coupled to a graphic bus 122 and to the graphics processor 125 as shown in FIG. 1.

The parameter register 810 stores the operational parameters for the graphics engine 870. These parameters include at least the normalized mesh flag, the window size, and the mesh ratio. The normalized mesh flag informs the graphics engine if the vertex buffer 840 is normalized.

The triangle index array 820 stores the triangle indices and the corresponding vertex references. The triangle index arrays 820 is loaded by the processor 110 or the graphics processor 125 via the graphic bus 122. The triangle index array 820 provides the triangle indices and the vertex references to the graphics engine 870 and the address generator and comparator 830. Normally, the triangle index array 820 is accessed sequentially as the graphics engine 870 processes the mesh pool. Therefore, the addressing mechanism for the triangle index array 820 is simple and can be implemented by a counter. Alternatively, the graphics engine 870 may address the triangle index array 820.

The address comparator and generator 830 generates the addresses to the vertex buffer 840 (and to the triangle index array 820 if necessary), and performs address comparison. The address comparator and generator 830 determines the addresses for the vertex buffer 840 using the reference data provided by the triangle index array 820. The address comparator and generator 830 also compares the generated addresses with the window size to determine if a window boundary has been crossed. Depending on the result of the address generation and comparison, the address comparator and generator 830 sends a control signal to the data fetcher 850 and a selection signal to the multiplexer 860. For example, if it is determined that the vertex buffer 840 does not contain the vertex information, then the address comparator and generator 830 sends a control signal to the data fetcher 850 to fetch the necessary information and to switch the multiplexer to select the data from the data fetcher 850 directly. This situation is particularly relevant when the meshes are unnormalized which have many references that are outside the vertex buffer locality.

The vertex buffer 840 stores the vertex information including the vertex coordinate values. The vertex buffer 840 is typically allocated with a size compatible with the window size of the normalized meshes or with a predetermined size for unnormalized meshes. In one embodiment, the size of the vertex buffer 840 is a multiple of the window size so that a number of windows of the vertex data can be stored in the vertex buffer 840 at the same time. In addition, the vertex buffer 840 may be implemented as a circular buffer so that as a window is no longer needed, a new window may be loaded in to maintain continuous data fetching. The loading of the vertex buffer 840 may be carried out in a pipeline fashion such that while a set of data are read by the graphics engine 870, another set of new data is written in.

The data fetcher 850 fetches the vertex information from the external memory via the graphics bus 122. The data fetcher 850 receives control signals from the address comparator and generator 830 to perform the fetching. If the vertex buffer 840 is implemented as a circular buffer, the address comparator and generator 830 sends a control signal to the data fetcher 850 when a window boundary has been crossed so that the data fetcher 850 can begin fetching new data to the vertex buffer 840. In addition, when the data is not in the vertex buffer 840, the data fetcher 850 can fetch the needed data and bypasses the vertex buffer 840 to send to the multiplexer 860 directly. This situation may occur when the meshes are not normalized or when the references occasionally cross a reference locality.

The multiplexer 860 provides a selection of the data path for the vertex information to the graphics engine 870. The multiplexer 860 receives the select signal from the address comparator and generator 830.

The graphics engine 870 receives the operational parameters from the parameter register 810, generates control signals to the triangle index array 820 and the address comparator and generator 830, and receives the vertex information through the multiplexer 860. The graphics engine 870 provides the processed data to the graphics processor for further processing or display. The graphics engine 870 may perform a preliminary processing or a graphic transformation before sending data to the graphics processor.

Figure 9:
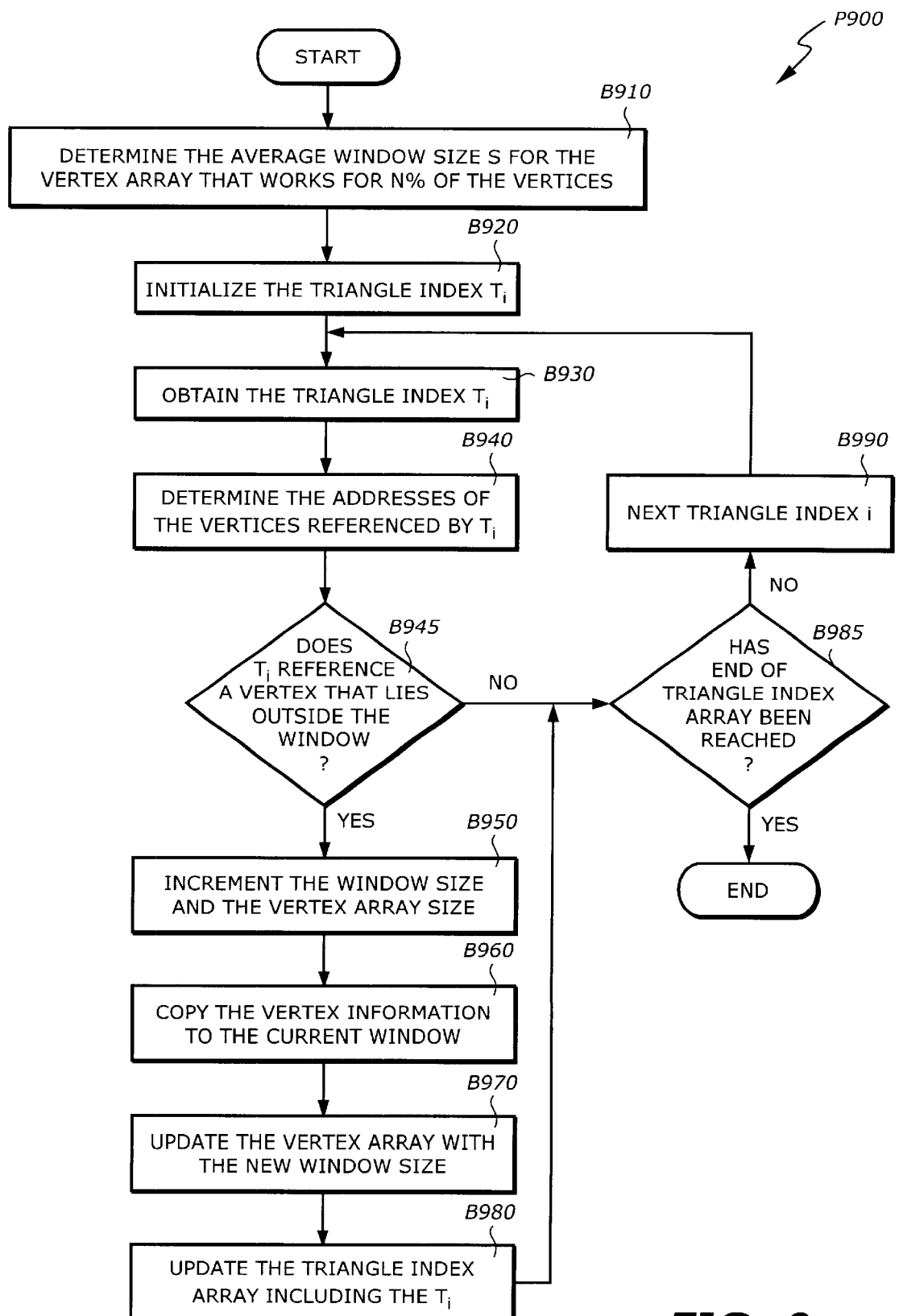
FIG. 9 is a flow diagram illustrating a process to normalize meshes with same window size according to one embodiment of the invention.

FIG. 9 is a flow diagram illustrating a process P900 to normalize meshes with the same window size according to one embodiment of the invention.

Upon START, the process P900 determines the average window size S for the vertex array that works for approximately N% of the vertices (Block B910). In other words, about N% of the vertices can be referenced locally within a window of size S. The value N is determined according to some predefined criteria. Typically, N% is about 90%. The process P900 then initializes the triangle index I for triangle $T_i$ (Block B920). Next, the process P900 obtains the triangle index $T_i$ (Block B930). From the triangle index $T_i$, the process P900 obtains the vertex references and determines the addresses of the vertices referenced by $T_i$ (Block 940).

The process P900 then determines if $T_i$ references a vertex that lies outside the window (Block B945). This can be performed by comparing the addresses of the vertex with the upper and lower limits formed by the window center addresses and the window size S. If the referenced vertex does not lie outside the current window, the process P900 determines if all the triangle indices have been processed (Block B985). If the end of the triangle index array has been reached, the process P900 terminates. If the end of the triangle index array has not been reached, the process P900 updates the triangle index I (Block B990) and returns to Block B930.

If the referenced vertex lies outside the current window, the process P900 increments the window size and the vertex array size by one in anticipation of a copy of the vertex information to the current window (Block B950). The process P900 then copies the vertex information from the referenced location to the current window (Block B960). The process P900 then updates the vertex array with the new window size (B970). For example, the vertex array may be pushed down one location to make room for the newly acquired entry. Then the process P900 updates the triangle index array to reflect the new references which include the $T_i$ references. The process P900 then goes to block B985 to determine if the end of the triangle index array has been reached.

Figure 10:
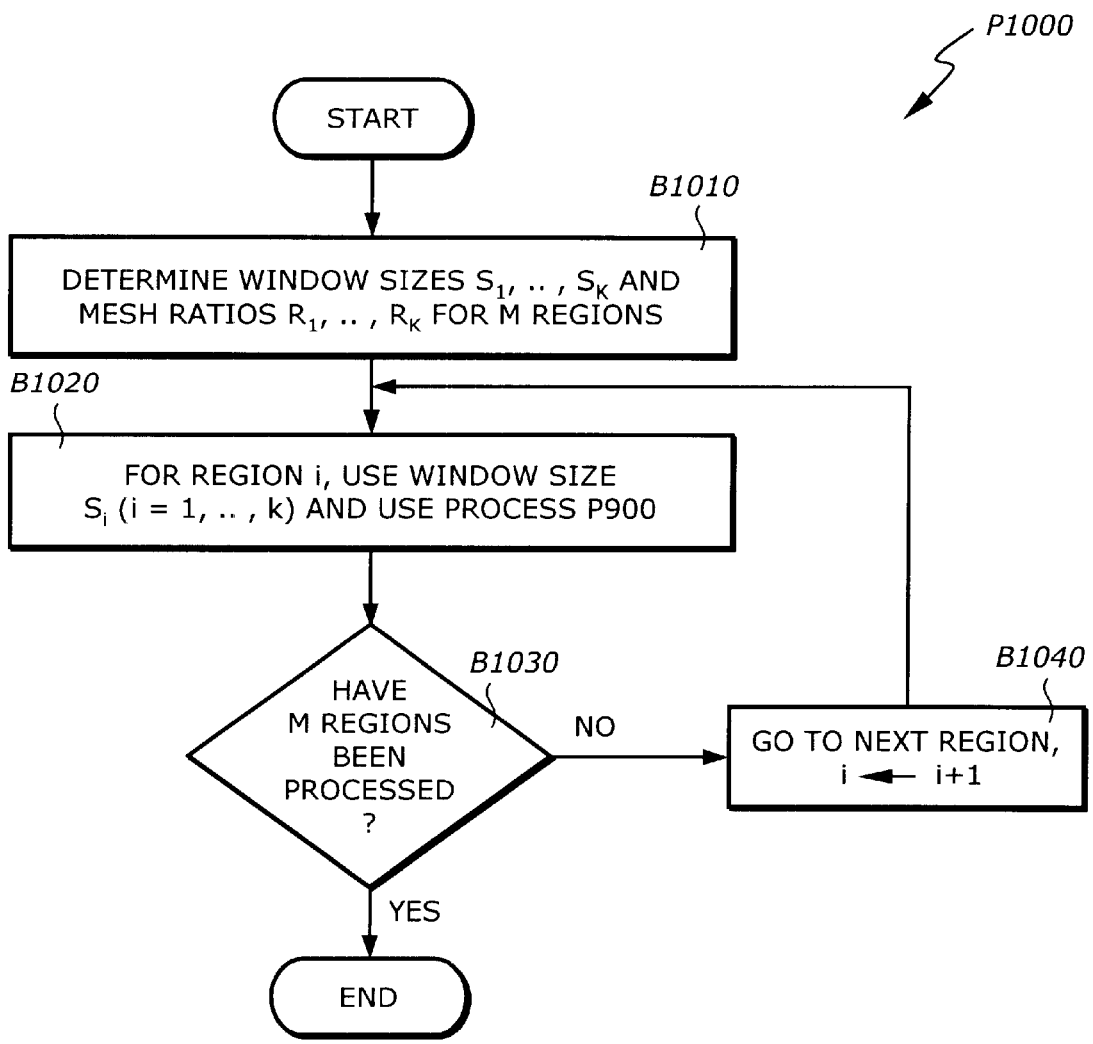
FIG. 10 is a flow diagram illustrating a process to normalize meshes with different window sizes according to one embodiment of the invention.

FIG. 10 is a flow diagram illustrating a process P1000 to normalize meshes with different window sizes according to one embodiment of the invention.

Upon START, the process P1000 determines the window sizes $S_1, \ldots S_k$ and the mesh ratios $R_1, \ldots, R_k$ for the M regions of the vertex array (Block 1010). For each region i, the process P1000 uses the corresponding window size $S_i$ and proceeds using the process P900 as described in FIG. 9 (Block B1020). Then the process P1000 determines if M regions have been processed (Block B1030). If not, the process P1000 goes to the next region (Block B1040) and returns back to Block B1020 to process the next region. If all regions have been processed, the process P1000 terminates.

Figure 11:
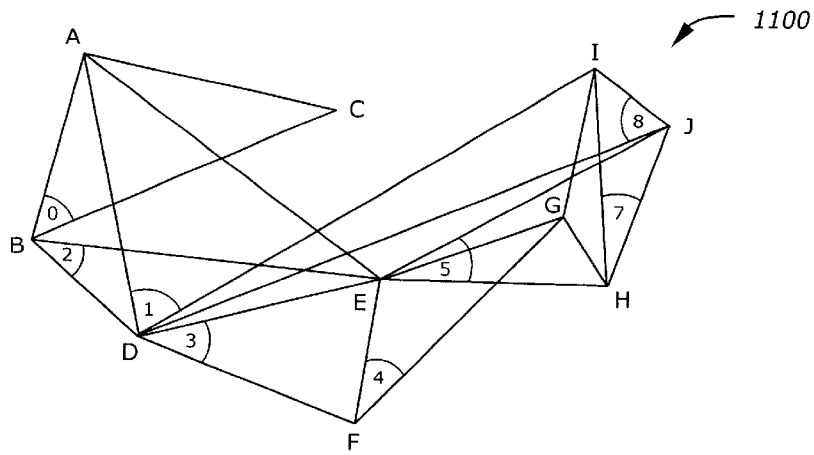
FIG. 11 is a diagram illustrating an example of a set of triangles according to one embodiment of the invention.

FIG. 11 is a diagram illustrating an example of an object 1100 according to one embodiment of the invention. The object 1100 includes 9 triangles numbered 0 through 8. The triangle indices are shown in the corner of each triangle. The vertices of 9 triangles are A, B, C, D, E, F, G, H, I and J. Many vertices are common to several triangles.

Figure 12:
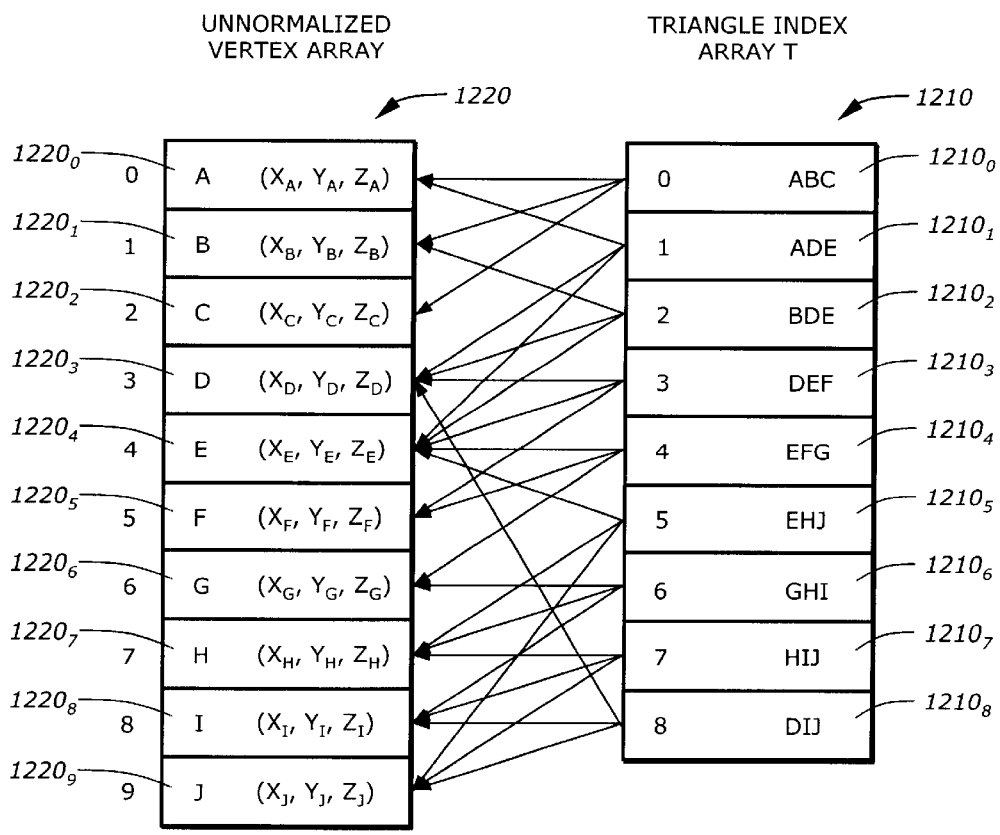
FIG. 12 is a diagram illustrating arrays for processing unnormalized meshes in the example of FIG. 11 according to one embodiment of the invention.

FIG. 12 is a diagram illustrating arrays for processing unnormalized meshes in the example of FIG. 11 according to one embodiment of the invention. The mesh pool 1200 includes an unnormalized vertex array 1220 and a triangle index array 1210. The unnormalized vertex array 1220 has 10 entries numbered 0 through 9 corresponding to 10 vertices A, B, C, D, E, F, G, H, I, and J. Each entry contains three coordinates values. For example entry 0 contains ($X_A$, $Y_A$, $Z_A$) for vertex A, entry 1 contains ($X_B$, $Y_B$, $Z_B$) for vertex B, etc.

The triangle index array 1210 has 9 entries numbered 0 through 8 corresponding to 9 triangles. Each entry contains the vertex references which define the triangle. For example, entry 0 contains the vertex references A, B, C, entry 1 contains the vertex references A, D, E, etc.

Figures 13A, 13B:
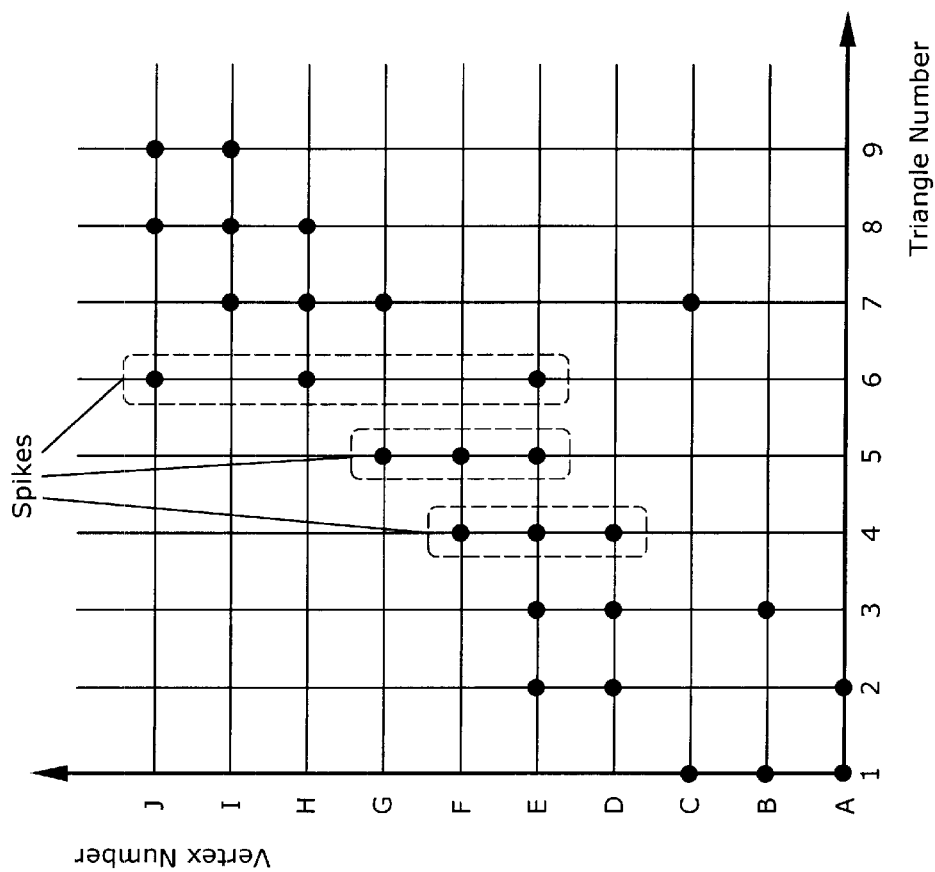
FIG. 13A is a diagram illustrating spikes in a performance curve caused by processing unnormalized meshes in the example of FIG. 11 according to one embodiment of the invention.
FIG. 13B is a diagram illustrating the reference pointers stored in the triangle index array for the unnormalized meshes in the example of FIG. 11 according to one embodiment of the invention.

FIG. 13A is a diagram illustrating spikes in a performance curve caused by processing unnormalized meshes in the example of FIG. 11 according to one embodiment of the invention. The horizontal axis shows the triangle number and the vertical axis shows the vertex number. Since the vertex array is unnormalized, there is no duplication of vertex numbers on the vertical axis. The dots shown in the diagram shows the vertices for the corresponding triangle. For example, the three dots A, B, and C at the vertical line 0 correspond to the three vertices A, B, and C for triangle 0.

Suppose the cache locality is defined as 4, i.e., the cache boundary is between vertices E and F, then if the vertices of a triangle are referenced across the cache boundary, a spike results, indicating that a dirty writeback may be necessary to bring the outside reference to the cache. In the diagram, there are three spikes for triangles 3, 4, and 5.

FIG. 13B is a diagram illustrating the reference pointers stored in the triangle index array for the unnormalized meshes in the example of FIG. 11 according to one embodiment of the invention. For example, triangle 5 references vertices 4, 7 and 9.

Figure 14:
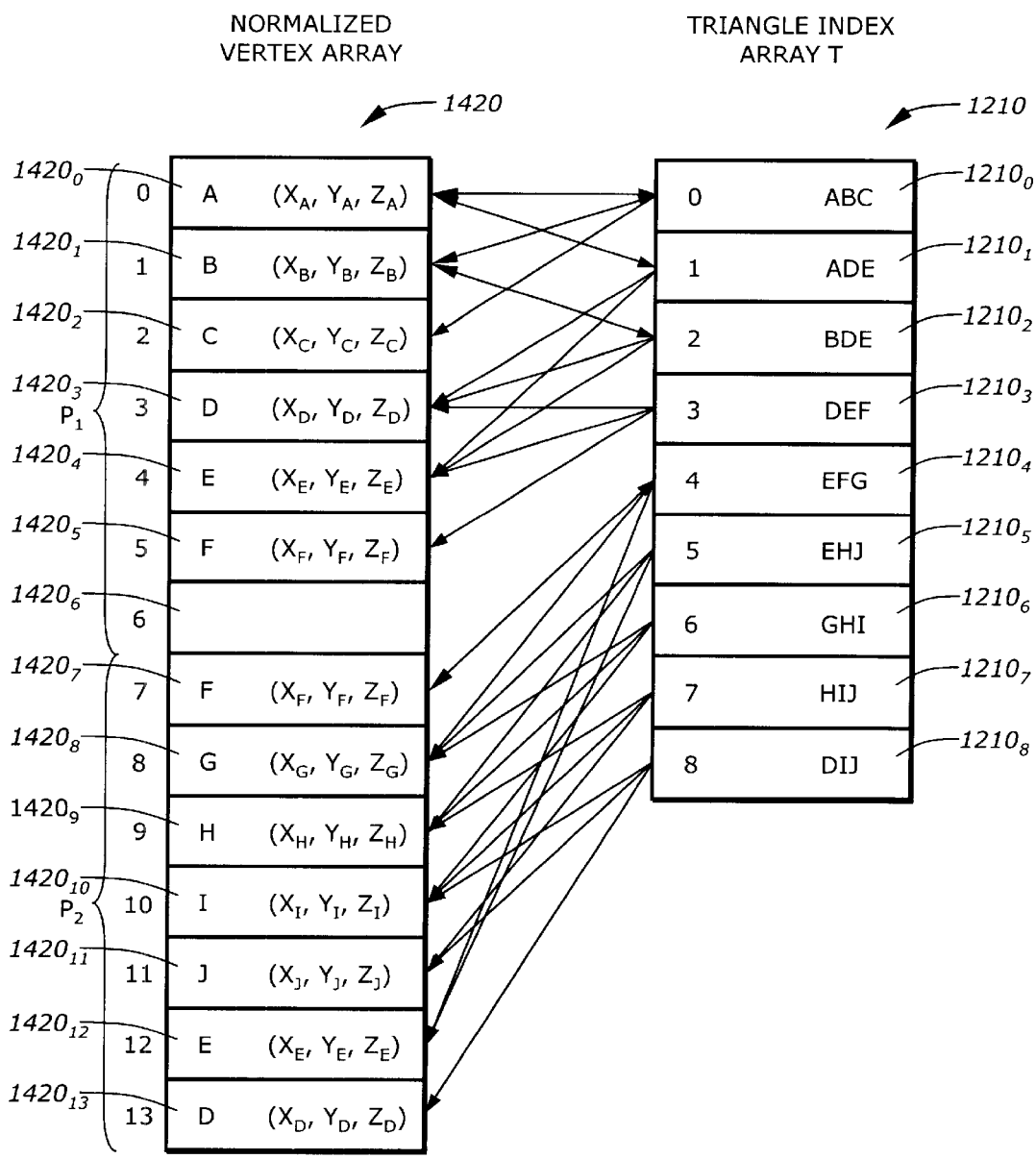
FIG. 14 is a diagram illustrating arrays for processing normalized meshes in the example of FIG. 11 according to one embodiment of the invention.

FIG. 14 is a diagram illustrating arrays for processing normalized meshes in the example of FIG. 11 according to one embodiment of the invention. The mesh pool now includes a normalized array 1420 and the triangle index array 1210.

The normalization of the vertex array copies the vertex entries in localized window. In this example, the window size becomes 7. Since a fixed window size is used, there may be empty entries in a window. For example, entry 6 in the vertex array 1420 is empty. In this example, triangles 0, 1, 2, and 3 reference all vertices stored in window p1; triangles 4, 5, 6, 7, and 8 reference all vertices stored in window P2. Since there is no crossing of window boundary, the window reference locality is preserved.

Figures 15A, 15B:
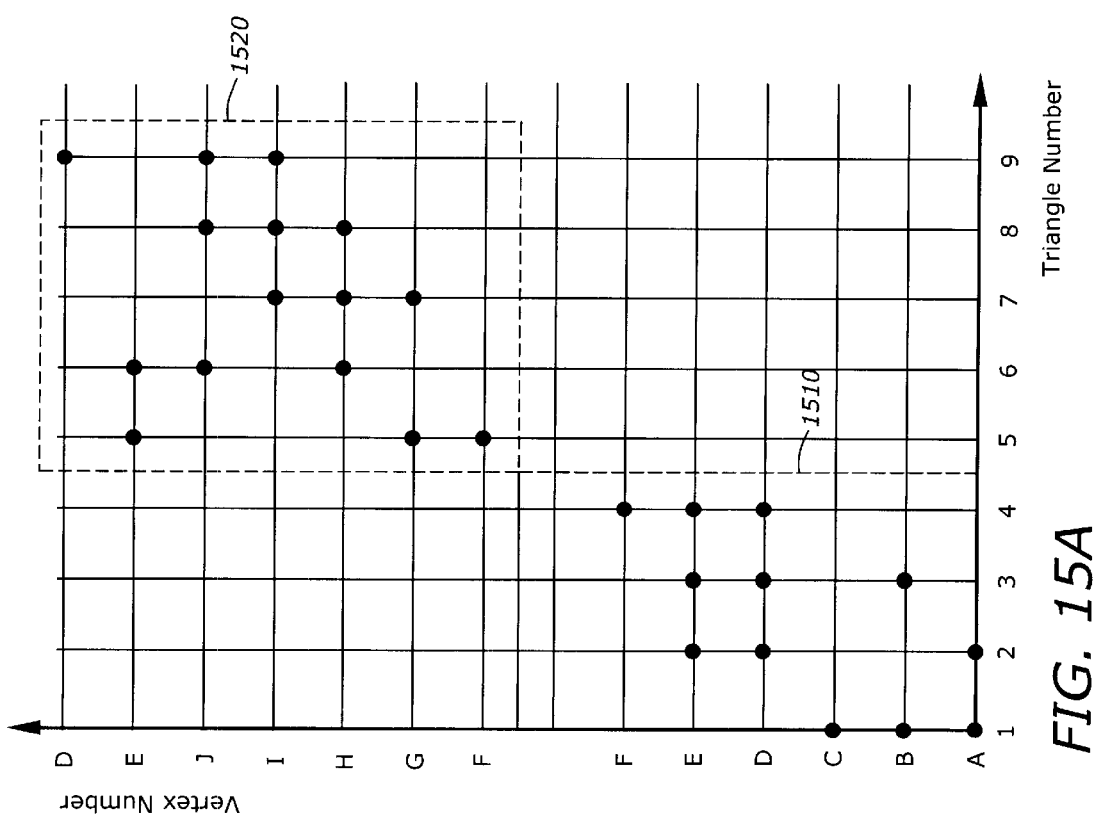
FIG. 15A is a diagram illustrating a performance curve for processing normalized meshes with separated vertex windows in the example of FIG. 11 according to one embodiment of the invention.
FIG. 15B is a diagram illustrating the reference pointers stored in the triangle index array for the normalized meshes in the example of FIG. 11 according to one embodiment of the invention.

FIG. 15A is a diagram illustrating a performance curve for processing normalized meshes with separated vertex windows in the example of FIG. 11 according to one embodiment of the invention. The diagram includes two groups 1510 and 1520. The vertical axes now have redundant vertex numbers. For example, vertices D, E, and F are duplicated. It is seen that there is no spike because there is no reference that crosses a window boundary. The groups 1510 and 1520 contain the vertex references in the first and second windows, respectively. The two groups are separated.

FIG. 15B is a diagram illustrating the reference pointers stored in the triangle index array for the normalized meshes in the example of FIG. 11 according to one embodiment of the invention. It is seen that the references have been updated to reflect the new references caused by the duplication of the vertex entries in the vertex array.

Therefore, the present invention provides a technique to process normalized meshes and to normalize unnormalized meshes. The technique helps improve the access time of the vertex array by grouping the vertex data in localized windows. The technique can be realized by software or hardware and can be used in conjunction with a graphics processor to improve the performance.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:

storing M vertex coordinates in a vertex array corresponding to M vertices of N polygons, and N polygon indices in an index array, each of the N polygon indices referencing a predetermined number of the M vertex coordinates;

normalizing the vertex array such that a first subset of the vertex array containing M1 vertex coordinates are referenced by a second subset of the index array containing N1 polygon indices, the second subset defining a window having a small size relative to the vertex array; and processing the M1 vertex coordinates in the first subset to generate processed data for further processing or displaying.

2. The method of claim 1 further comprising:

updating the window by selecting a third subset of the vertex array such that the third subset contains M2 vertex coordinates corresponding entirely to N2 polygon indices in a fourth subset of the index array while sliding the window along the vertex array until the entire vertex array has been processed.

3. The method of claim 1 further comprising concurrently sending the processed data to a graphics processor in an on-line manner.

4. The method of claim 1 wherein normalizing comprises:

determining a window of reference in the vertex array having a small size relative to the vertex array;

determining a vertex reference from one of polygon indices in the index array; and if the vertex reference lies outside the window of reference, copying the vertex reference to a neighborhood of the window of reference, and updating the window of reference to include the copied vertex reference.

5. The method of claim 4 further comprising:

updating the vertex array; and updating the index array.

6. The method of claim 5 wherein updating the vertex array includes re-arranging the vertex coordinates in the vertex array to include the updated window of reference.

7. The method of claim 5 wherein updating the index array includes replacing the vertex reference by a new reference to the copied vertex reference.

8. The method of claim 6 wherein updating the index array includes changing the vertex references to point to the updated vertex array.

9. An apparatus comprising:

an index array to store polygon indices corresponding to meshes;

a vertex buffer coupled to the index array to store vertex information in a normalized vertex array, the normalized vertex array having a first subset containing M1 vertex coordinates referenced by a second subset of the index array; and an address generator coupled to the index array and the vertex array to address the vertex buffer based on the second subset of the index array.

10. The apparatus of claim 9 further comprising:

a graphics engine coupled to the vertex buffer to receive the vertex information, the graphics engine performing a graphic transformation to the vertex information.

11. The apparatus of claim 9 further comprising:

a data fetcher coupled to the vertex buffer to fetch vertex information from a memory via a graphic bus upon receiving a control signal; and a multiplexer coupled to the vertex buffer, the data fetcher, and the graphics engine to select vertex information to the graphics engine.

12. A system comprising:

a bus; and a processor coupled to the bus, the processor comprising:
an index array to store polygon indices corresponding to the polygon meshes,
a vertex buffer coupled to the index array to store vertex information in a normalized vertex array, the normalized vertex array having a first subset containing M1 vertex coordinates referenced by a second subset of the index array, and
an address generator coupled to the index array and the vertex array to address the vertex buffer based on the second subset of the index array.

13. The system of claim 12 further comprising:

a graphics engine coupled to the vertex buffer to receive the vertex information, the graphics engine performing a graphic transformation to the vertex information.

14. The system of claim 12 further comprising:

a data fetcher coupled to the vertex buffer to fetch vertex information from a memory via a graphic bus upon receiving a control signal; and a multiplexer coupled to the vertex buffer, the data fetcher, and the graphics engine to provide vertex information to the graphics engine.

15. A system comprising:

a bus;

a memory coupled to the bus, the memory storing instructions; and a processor coupled to the bus and the memory, the processor executing the instructions to at least:
store M vertex coordinates in a vertex array corresponding to the M vertices of the N polygons, and N polygon indices in an index array, each of the N polygon indices referencing a predetermined number of the M vertex coordinates,
normalize the vertex array such that a first subset of the vertex array containing M1 vertex coordinates are referenced by a second subset of the index array containing N1 polygon indices, the second subset defining a window having a small size relative to the vertex array, and
process the M1 vertex coordinates in the first subset to generate processed data for further processing or displaying.

16. The system of claim 15 wherein the processor further executes the instructions to:

update the vertex array by re-arranging the vertex coordinates in the vertex array to include the updated window of reference; and update the index array by changing the vertex references to point to the updated vertex array.

17. The system of claim 15 wherein the processor further executes the instructions to:

update the index array by replacing the vertex reference by a new reference to the copied vertex reference.

18. The system of claim 15 wherein the processor executing instructions to normalize the vertex array executes instructions to:

determine a window of reference in the vertex array;
determine a vertex reference from one of the polygon indices in the index array; and
if the vertex reference lies outside the window of reference,
copy the vertex reference to a neighborhood of the window of reference, the vertex reference occupying at least two entries in the vertex array, and
update the window of reference to include the copied vertex reference.

19. The system of claim 18 wherein the processor further executes the instructions to transform the M1 vertex coordinates according to a graphic transformation.

20. The system of claim 18 wherein the small size is less than or equal to a predetermined size.

* * * * *